United States Patent [19]

Lamarche

[11] 4,232,534
[45] Nov. 11, 1980

[54] EXTENDED TRAVEL VIBRATION DAMPER ASSEMBLY

[75] Inventor: Paul E. Lamarche, Utica, Mich.

[73] Assignee: Borg-Warner Corporation, Chicago, Ill.

[21] Appl. No.: 933,392

[22] Filed: Aug. 14, 1978

[51] Int. Cl.³ .............................................. F16D 3/14
[52] U.S. Cl. .................................. 64/27 C; 192/106.2
[58] Field of Search ....................... 64/27 C, 27 F; 192/106.1, 106.2

[56] References Cited

U.S. PATENT DOCUMENTS

| 608,770 | 8/1898 | Godfray | 64/27 C |
|---|---|---|---|
| 1,192,731 | 7/1916 | Batchelder | 64/27 C |
| 2,005,655 | 6/1935 | Havill | 64/27 C |
| 2,149,887 | 3/1939 | Hickman | 64/27 C |
| 2,210,074 | 8/1940 | Friedman | 192/106.2 |
| 2,574,573 | 11/1951 | Libby | 192/106.2 |
| 2,632,318 | 3/1953 | Meyer | 64/27 C |
| 3,327,820 | 6/1967 | Maurice | 192/106.2 |
| 4,002,043 | 1/1977 | Yoshida | 64/27 C |
| 4,027,757 | 6/1977 | Radke et al. | 64/27 C |
| 4,101,015 | 7/1978 | Radke | 64/27 C |

FOREIGN PATENT DOCUMENTS

166939 7/1921 United Kingdom .

Primary Examiner—Ira S. Lazarus
Attorney, Agent, or Firm—James A. Geppert

[57] ABSTRACT

An extended travel vibration damper assembly for use in a torsional coupling such as a torque converter wherein the damper assembly is incorporated in a speed responsive lockup coupling between the impeller and the turbine of the torque converter. A rotatable member between the housing and turbine carries a plurality of speed-responsive actuated friction clutches and is connected to the driving housing of the vibration damper. Within the housing are a pair of floating equalizers journalled on a hub having a pair of radially extending arms, and spring sets are positioned between the hub arms and equalizers for actuation by the housing to rotate the hub which is operatively connected to the turbine of the torque converter.

22 Claims, 15 Drawing Figures

Fig. 1.

EXTENDED TRAVEL VIBRATION DAMPER ASSEMBLY

BACKGROUND OF THE INVENTION

A vibration damper assembly conventionally is utilized in a clutch assembly in the drive train between an automotive engine and a manual transmission to neutralize any torsional vibrations emanating from the engine. A torque converter normally does not require a vibration damper as undesirable vibrations are hydraulically dampened in the converter. However, where a lock-up coupling is inserted into the torque converter to improve efficiency at high speeds, vibrations again become a problem.

In the present invention, a plurality of centrifugally actuated friction clutches form the lock-up coupling between the impeller and turbine of the torque converter, and an extended travel vibration damper is inserted in the carrier for the friction clutches and acts to overcome the problems of torsional vibrations in the torque converter.

SUMMARY OF THE INVENTION

The present invention relates to an improved vibration damper assembly for use in a lock-up coupling for a torque converter of the centrifugally-actuated type to provide a relatively high amplitude damping at a low spring rate. The damper is compact, self-contained and substantially completely enclosed except for the hub barrel. The compression springs in the damper assembly are chosen to complement the performance curve of the centrifugally-actuated lock-up coupling, and the damper is arranged to be positioned within a relatively small space provided between the housing and the turbine of the torque converter.

The present invention also comprehends a vibration damper assembly inserted in a carrier for a centrifugally actuated lock-up coupling where a suitable one-way clutch is located between the hub of the torque converter turbine and the hub of the vibration damper. A one-way clutch is utilized in the vibration damper assembly so that the lockup coupling will only be engaged in the drive direction; the one-way clutch preventing engagement of the lock-up coupling in the coast direction.

The present invention further comprehends a vibration damper assembly having improved compression spring separators in each equalizer which are rockable over a limited extent to prevent unequal engagement of the compression spring sets. Each equalizer comprises a pair of generally flat plates journalled on the hub and having oppositely extending projections or tabs on the periphery thereof with an opening in each tab. A flat yoke bridges the spacing between the plates and is provided with a pair of lugs extending into and through the openings for swaging. A generally V-shaped spring separator is positioned in a central slot in the flat yoke and has inclined edges adapted to be engaged by the damper springs.

The present invention also comprehends a vibration damper assembly having a generally wedge-shaped spring separator member pivotally mounted between the aligned arms of an equalizer. The aligned equalizer arms of the two plates journalled on the hub are joined together by a pivot pin securing the arms together and passing through an opening in the separator located between the two arms. The separator has inclined edges to engage the ends of adjacent compression springs and a slightly elongated opening receiving the pivot pin to allow a limited amount of adjustment by the separator.

The present invention further provides a vibration damper assembly capable of receiving oversized springs for the central spring pocket to enhance the damping characteristics. In this arrangement, arcuate cut-outs are provided in the side walls of the damper housing to allow larger than normal diameter compression springs for damping.

The present invention further envisions a vibration damper assembly which may easily be utilized for a clutch friction plate in a vehicle clutch as well as for a lock-up coupling for a torque converter.

Further objects are to provide a construction of maximum simplicity, efficiency, economy, and ease of assembly and operation, and such further objects, advantages and capabilities as will later be described and are inherently possessed thereby.

DESCRIPTION OF THE PREFERRED EMBODIMENTS

Referring more particularly to the disclosure in the drawings wherein are shown illustrative embodiments of the present invention, FIGS. 1 through 4 disclose an extended travel damper assembly 10 utilized in conjunction with a speed responsive lock-up coupling or clutch 11 for a torque converter 12 of an automatic transmission in an automotive vehicle (not shown). The torque converter 12 includes a housing 13 operatively connected to an engine drive shaft (not shown) at its inner periphery, an impeller 14 connected to the housing, a turbine 15 and a stator 16 conventionally arranged to provide torque multiplication for the automatic transmission. The inner periphery of the turbine shell 17 is secured to a turbine hub 18 having an outer splined surface 19 and an interior splined recess 21 to receive the splined end 22 of a transmission input shaft. A thrust washer 23 is positioned on the reduced end 24 of the turbine hub 18 between the housing 13 and the damper assembly 10 to provide a bearing surface therefor.

Figure 1:
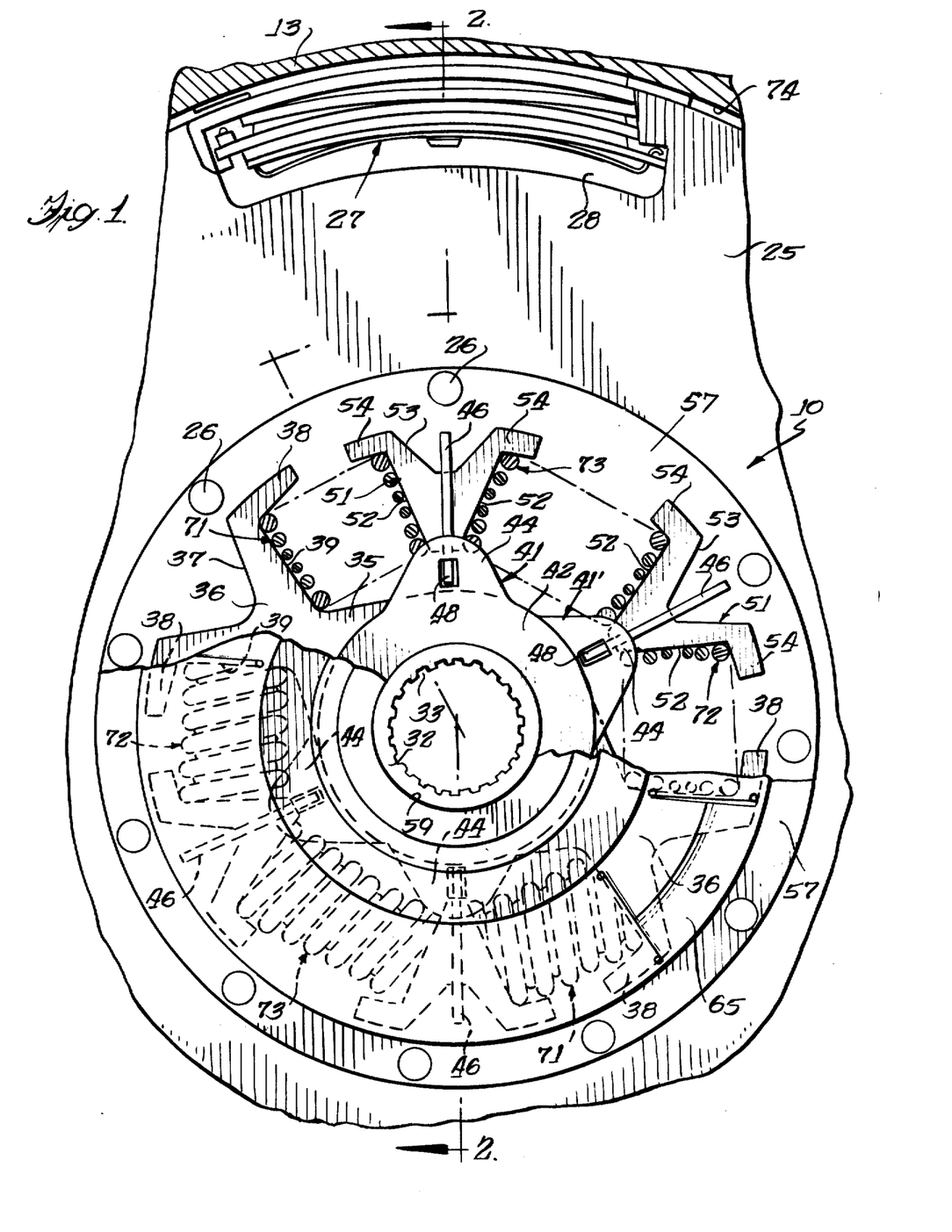
FIG. 1 is a partial rear elevational view with portions broken away of an extended travel vibration damper utilized with a speed responsive lock-up coupling in a torque converter with the converter structure omitted.
Figures 2, 3, 4:
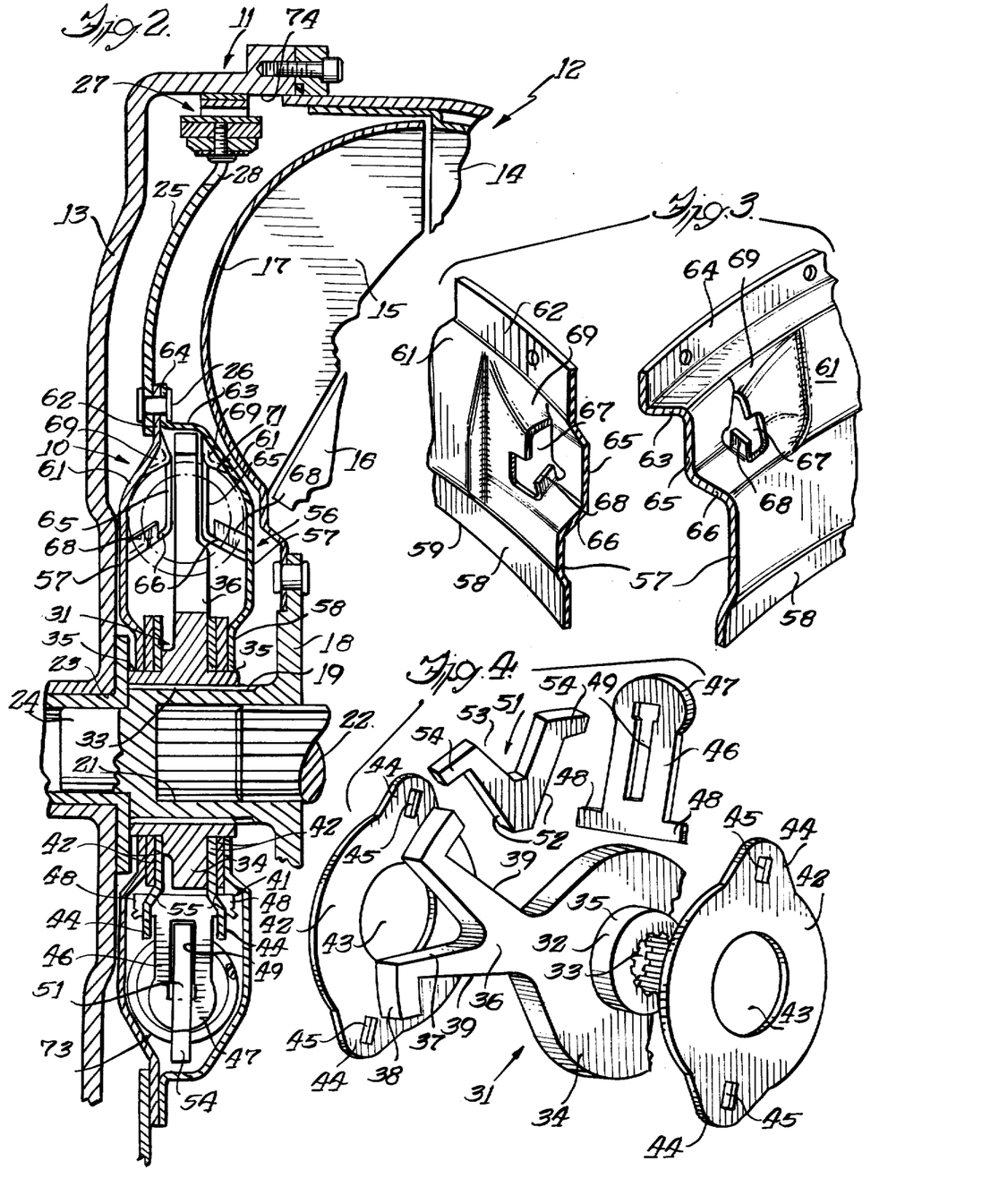
FIG. 2 is a partial cross sectional view taken on the irregular line 2—2 of FIG. 1 and showing a portion of the torque converter.
FIG. 3 is a partial exploded perspective view of the damper housing.
FIG. 4 is a partial exploded perspective view of the hub, equalizer and spring separator for the damper.

A rotatable member 25 is positioned between the housing 13 and the turbine shell 17 and is secured at its inner periphery to the damper assembly 10 by a series of suitable securing means, such as rivets 26. The outer periphery of member 25 supports a plurality of friction shoe assemblies 27 in circumferentially spaced openings 28. The structure of the friction shoe assemblies is more specifically set forth in the Russell E. Silberschlag pending U.S. Patent Application Ser. No. 900,385 filed Apr. 26, 1978; the disclosure of this application being incorporated by reference.

The vibration damper assembly 10 includes a rotatable hub 31 having a barrel 32 with a central splined opening 33 receiving therein the outer splined surface 19 of the turbine hub 18, an integral radial flange 34 defining shoulders 35,35, and a pair of oppositely disposed outwardly extending arms 36,36, each having a central V-shaped notch 37 in the outer edge. Each arm has outwardly diverging edges 39,39 terminating in a pair of circumferentially oppositely extending fingers 38,38.

Journalled on the hub barrel 32 are a pair of floating equalizers 41,41', each equalizer including a pair of generally flat plates 42,42 mounted on opposite sides of the hub flange 34. Each plate 42 is generally circular with a central opening 43 receiving a shoulder 35 of the barrel 32 and has a pair of oppositely disposed projections or tabs 44,44; each tab having a generally rectangular opening 45 formed therein. Mounted between aligned tabs 44,44 of the two plates is a generally flat yoke 46 having an elongated body with a rounded end 47 and a pair of laterally extending lugs 48,48 at the opposite end received within the aligned openings 45,45 and adapted to be upset to retain the plates together. The yoke is provided with an elongated slot 49 receiving a V-shaped spring separator 51 having outwardly diverging edges 52,52, a central notch 53 in the outer edge and a pair of circumferentially oppositely extending fingers 54,54. As seen in FIG. 2, the two inner plates 42,42 form one equalizer 41 with the tabs 44 outwardly offset at 55, while the two outer plates form the second equalizer 41' with the tabs of these plates lying in the same plane as the plate.

Substantially completely encompassing the hub and equalizers is a damper cover or housing 56 formed of a pair of generally flat cover plates 57,57, each having an inwardly offset central portion 58 defining a central opening 59 receiving an end of the hub barrel 32. Adjacent the rounded ends 47 of the yokes, the plates are inclined inwardly at 61 with the front plate 57 terminating in a radial flange 62 and the rear plate 57 having an annular portion 63 beyond the outer edges of the hub arms 36 and spring separators 51 and terminating in a radial flange 64 abutting the flange 62; the flanges being secured to the rotatable member 25 by the rivets 26.

Stamped out of the plates are oppositely disposed inwardly extending drive straps 65 having inward offsets 66; the straps lying closely adjacent and generally parallel to the hub arms 36. Also formed out of the cut-outs 67 provided by the stamped straps 65 are a pair of ears 68 to prevent excessive wear between the damper springs and the housing. Reentry ramps 69 are also formed at the cut-outs 67 which both act as retainers for the springs and as inclined planes to prevent outward movement of the springs as the straps 65 are moved away from the hub arms 32. Two groups of spring sets 71,72,73 are provided within the damper housing between the hub arms 32 and spring separators 51 on the equalizers. The spring sets engage the diverging edges 52 of the separators 51 to urge them outwardly from the hub barrel as limited by the yoke 46. The two groups of springs act in parallel with the spring sets in each group acting in series. Each spring set consists of two or three concentric springs, and each set may vary in its spring rate. Although the spring sets in each group may have identical rates or differing rates, it is preferred that the central spring set 73 between the equalizers has the highest rate while the other two spring sets 71 and 72 have lower identical rates.

As disclosed in the above mentioned U.S. patent application, the friction shoe assemblies 27 do not move outwardly under centrifugal force to engage the interior surface 74 of the torque converter housing 13 until a speed of 500 rpm is reached. As the lock-up coupling begins to engage to provide a direct drive between the impeller 14 and turbine 15 of the torque converter, the damper assembly is also actuated. Rotation of the member 25 causes rotation of the damper housing 56 so that the drive straps 65 engage the spring sets 71,71 of the two groups of spring sets. Compression of these two diametrically opposite spring sets causes the spring sets to react with one another through the equalizers 41,41'. As the spring sets 71 and 72 are preferably of equal rates, they will be compressed substantially equally as torque is applied, with the higher rate spring sets 73 being compressed to a lesser degree. As the torque increases due to the lock-up action, the spring sets 71 and 72 will be compressed until they reach solid height while the spring sets 73 are capable of additional compression. Obviously, the maximum deflection allowed by compression of the spring sets to their solid heights need not be reached, depending on the resistance to rotation of the hub 31 by the torque output means. Torque is transferred from the drive straps 65 through the spring sets 71,72,73 and equalizers 41,41' to the hub arms 36 to cause rotation of the hub under lock-up conditions. The spring rates in the damper assembly are designed to complement the action of the lock-up coupling.

Figure 5:
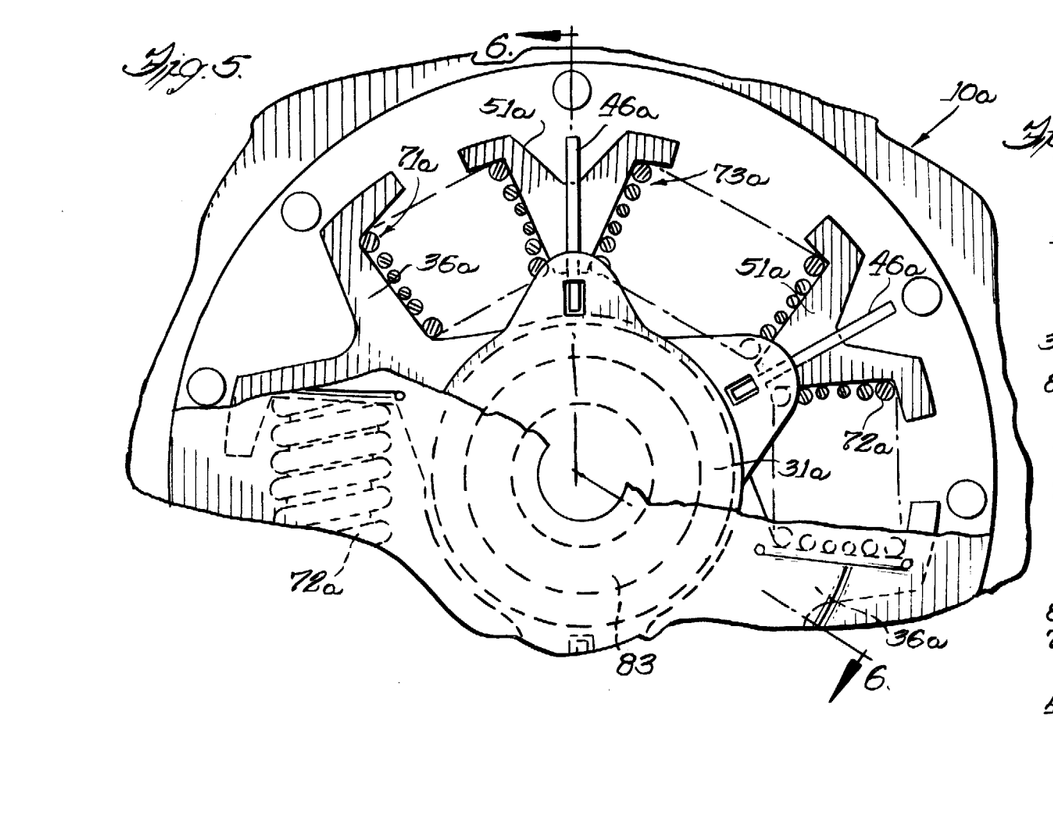
FIG. 5 is a partial rear elevational view with portions broken away of a second embodiment of damper.
Figure 6:
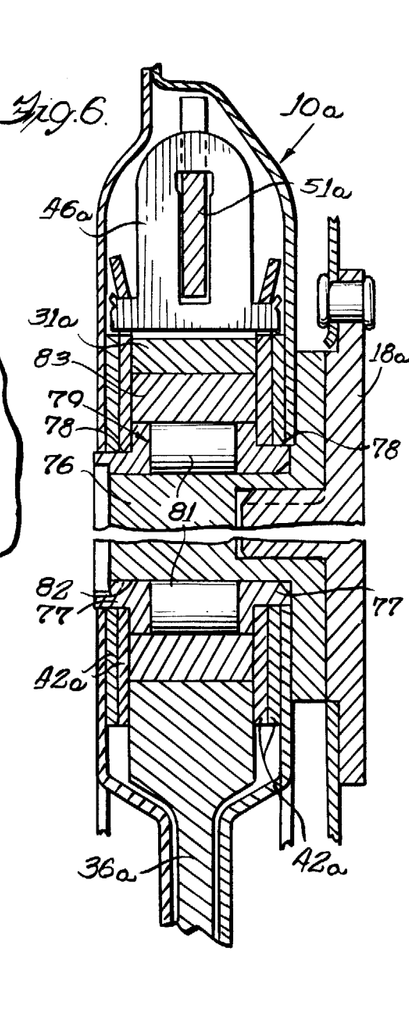
FIG. 6 is a partial vertical cross sectional view taken on the irregular line 6—6 of FIG. 5.
Figure 7:
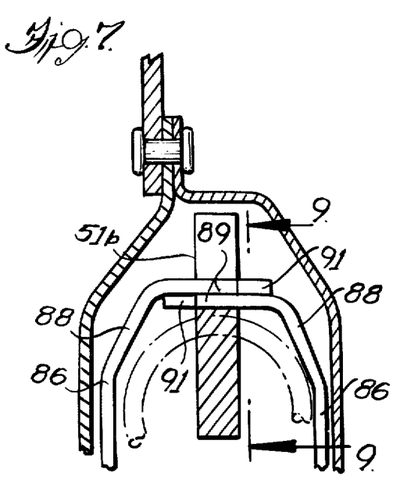
FIG. 7 is a partial vertical cross sectional view similar to the upper portion of FIG. 6 but showing a third embodiment of damper.
Figure 8:
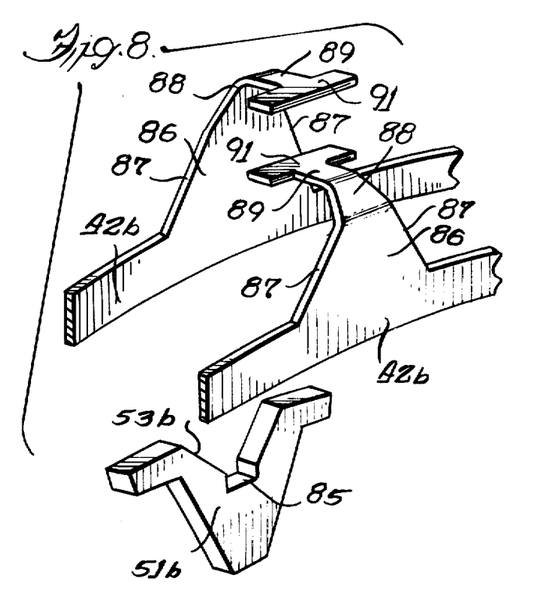
FIG. 8 is a partial exploded perspective view of a portion of an equalizer.
Figure 9:
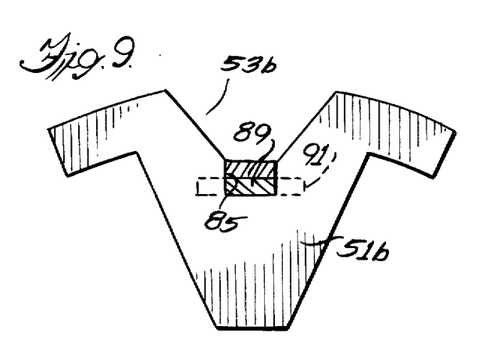
FIG. 9 is a partial cross sectional view taken on the line 9—9 of FIG. 7.
Figure 10:
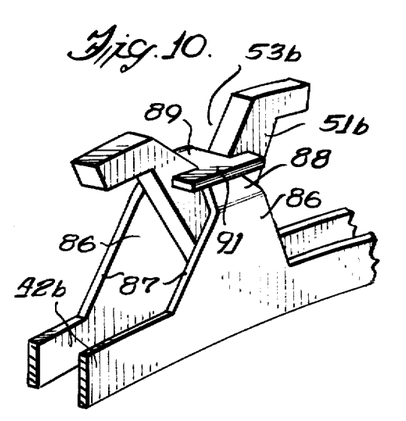
FIG. 10 is a partial perspective view of a portion of an equalizer in assembled relation.

FIGS. 5 and 6 disclose a second embodiment of damper assembly generally similar to that shown in FIGS. 1-4 with the addition of a one-way clutch 79, wherein identical parts will be designated by the same reference number with a script a. The damper assembly 10a is journalled on a thrust transfer member 76 operatively connected to the turbine hub 18a, with a pair of one-way clutch guides 77,77 mounted on the thrust transfer member 76 and providing shoulders 78,78 to journal the equalizer plates 42a,42a thereon. The guides enclose the clutch rollers 81 with the thrust transfer member exterior surface 82 providing the inner race of the clutch. An outer race 83 for the rollers 81 is press fitted within the hub 31a. A yoke 46a is mounted between pairs of equalizer plates 42a to carry a spring separator 51a, and spring sets 71a,72a,73a are positioned between the hub arms 36a and the separators 51a.

The one-way clutch 79 is arranged to lock-up in the drive direction of the torque converter so that the lock-up coupling and vibration damper will operate in the same manner as previously described. However, in the coast direction, the one-way clutch will free-wheel so that the lock-up coupling will positively disengage and the torque converter will operate in a conventional manner.

FIGS. 7 through 10 disclose an alternate method of positioning the spring separators in the equalizer and like parts will receive the same reference numeral with a script b. In this embodiment, the spring separator 51b is subtantially identical with the previous embodiments except that the notch 53b has a wide rectangular channel 85. Each equalizer plate 42b has a pair of diametrically opposed outwardly extending arms 86 having converging edges 87; the arms being in generally the same plane as the plate and provided with outer inwardly inclined portions 88 and transverse portions 89, each portion 89 terminating in a cross bar 91 to provide a T-shape. The transverse portions 89,89 of the aligned arms of the two plates are arranged in abutting relation within the channel 85 of the separator 51b and the cross bars 91,91 are positioned on the opposite surfaces of the separator so as to lock the arms in position (see FIGS. 7, 9 and 10). The spring sets (shown in dotted outline) react with the spring separator 51b to urge the separator against the transverse arm portions 89.

Figure 11:
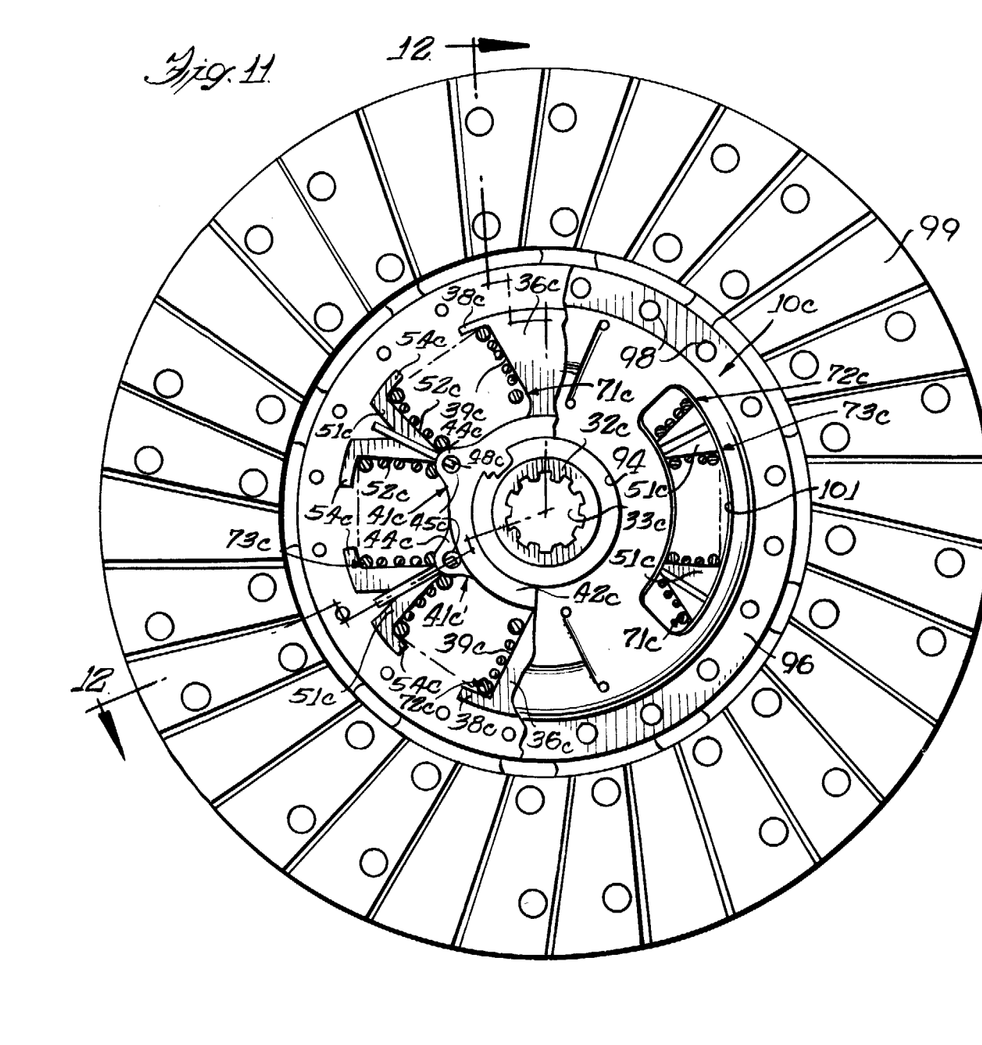
FIG. 11 is a rear elevational view partially broken away of a fourth embodiment of damper in a friction clutch.
Figure 12:
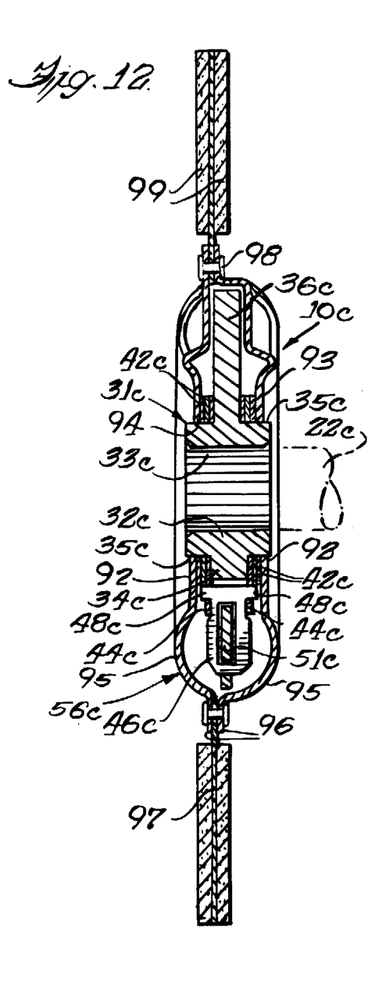
FIG. 12 is a cross sectional view taken on the irregular line 12—12 of FIG. 12.

FIGS. 11 and 12 disclose a fourth embodiment of vibration damper utilized for a vehicle clutch in a manual transmission with like parts having the same reference numeral with a script c. The vibration damper assembly 10c includes a hub 31c with a barrel 32c having a central splined opening 33c to receive the end of a transmission input shaft 22c and a radial flange 34c with a pair of arms 36c having diverging edges 39c terminating in circumferentially extending fingers 38c.

A pair of floating equalizers 41c,41c' are journalled on the shoulders 35c of the hub barrel 32c, with each equalizer consisting of a pair of plates 42c having central openings to receive the barrel. Each plate has a pair of oppositely disposed projections or tabs 44c with openings 45c to receive the lateral lugs 48c on a yoke 46c. A spring separator 51c having outwardly diverging edges 52c terminating in circumferentially extending ears 54c is received in an elongated slot in the yoke. Spring sets 71c,72c,73c are positioned between the hub arms 36c and the separators 51c of the equalizers 41c,41c'.

The damper housing 56c comprises a pair of generally flat housing plates 92 with central openings 94 receiving the hub barrel 32c and rounded portions 95 terminating in radial flanges 96,96; the flanges being slightly offset from the center of the damper assembly. An annular clutch plate 97 has its inner periphery located between the flanges 96,96, with the flanges and plate being suitably secured together, such as by rivets 98. A pair of annular clutch facings 99,99 are suitably secured to the opposite faces of the clutch plate 97 for engagement with a conventional flywheel and pressure plate of a vehicle clutch (not shown).

The dimensions of the rounded portions 95 of the housing plates effectively limits the spring rate of any given spring set by limiting the diameter of the outer spring in the set. The spring set 73c between the two equalizers normally has the highest spring rate and is the last of the three spring sets in the group to continue offering resistance to applied torque. To increase the spring rate of the central spring set 73c, an arcuate slot 101 is cut in the rounded portion 95 of each plate 92 at oppositely disposed locations so as to extend arcuately over a distance greater than the spring set 73c and the separators 51c. These slots allow a larger diameter outer spring to be utilized in the spring set.

Figure 13:
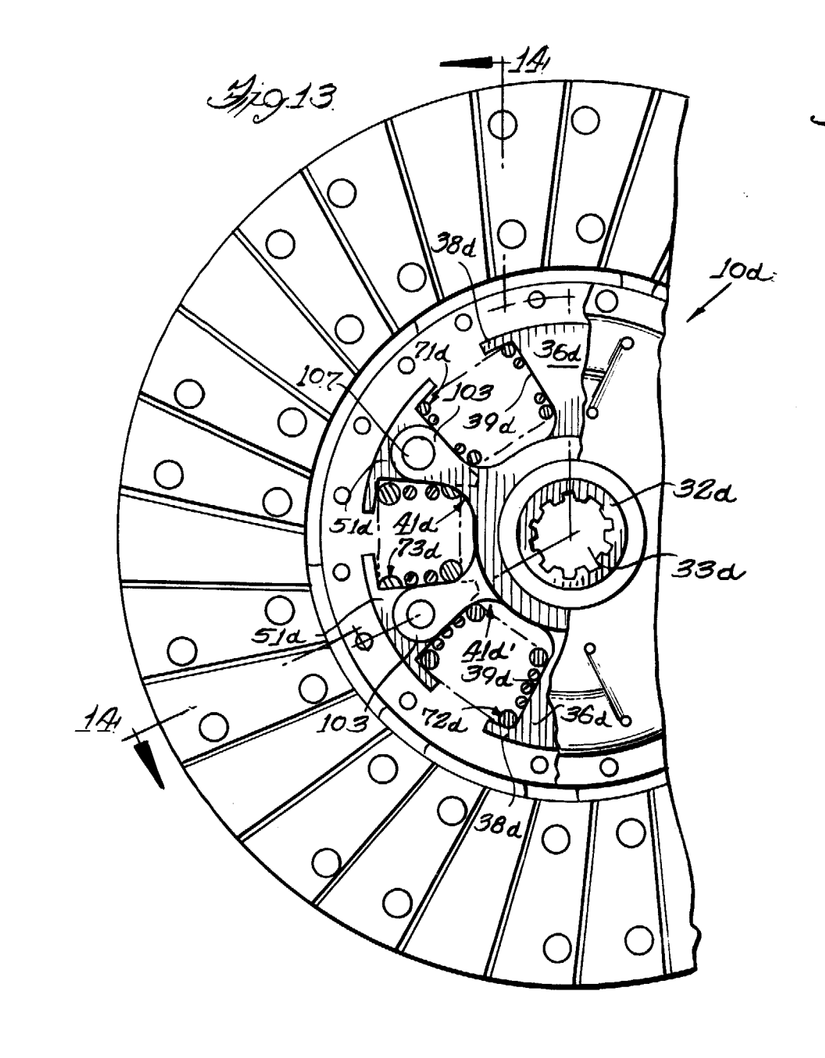
FIG 13 is a partial rear elevational view with portions broken away of a fifth embodiment of damper.
Figures 14, 15:
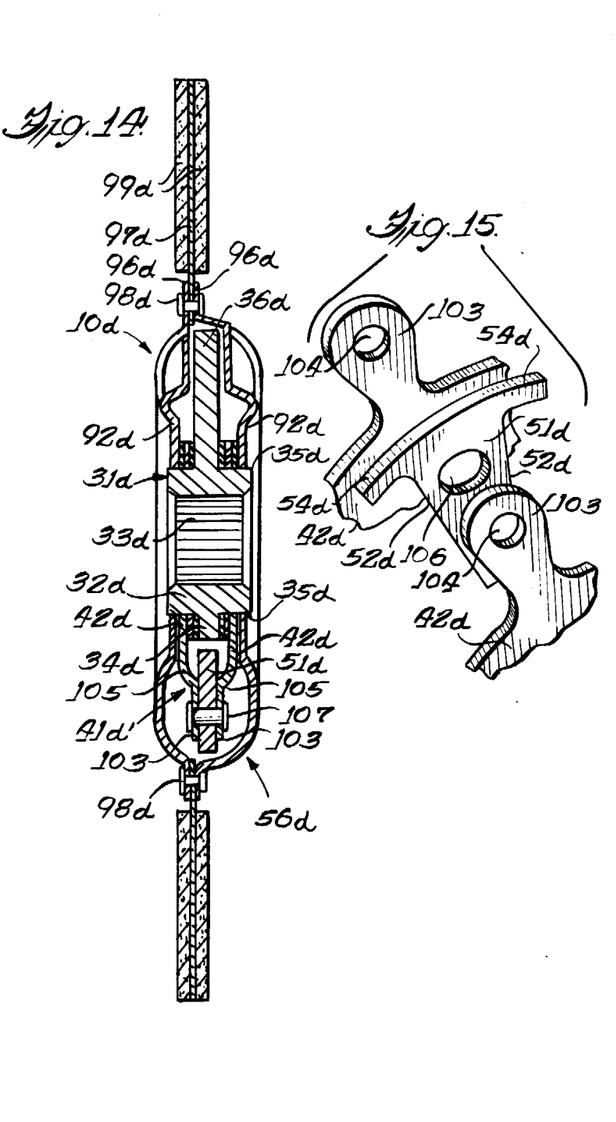
FIG. 14 is a cross sectional view taken on the irregular line 14—14 of FIG. 13.
FIG. 15 is a partial exploded perspective view of a portion of an equalizer for the damper.

FIGS. 13 through 15 disclose a fifth embodiment of damper assembly wherein like parts will have the same reference numeral with the addition of a script d. The damper assembly 10d is also shown utilized for a vehicle clutch in a manual transmission, wherein a hub 31d includes a barrel 32d with a splined opening 33d, and a radial flange 34d has a pair of oppositely disposed hub arms 36d with diverging edges 39d terminating in circumferentially extending fingers 38d. A pair of floating equalizers 41d,41d' are journalled on shoulders 35d of the barrel, with each equalizer comprising a pair of annular plates 42d; each plate having a pair of oppositely disposed elongated rounded tabs 103 having openings 104 therein. The tabs are inwardly offset at 105 relative to the plane of the plate 42d.

Positioned between a pair of axially aligned tabs 103 is a spring separator 51d of a generally wedge shape with outwardly diverging edges 52d terminating in circumferentially extending fingers 54d. Each separator 51d has a slightly elongated generally centrally located opening 106 axially aligned with the openings 104 so as to receive a rivet 107 to loosely mount the separator 51d in the equalizer; wherein the separator is allowed to pivot or shift slightly to adjust for the spring sets 71d,72d,73d if there are any problems of dimensions or angles.

The damper housing 56d comprises a pair of cover plates 92d which are substantially identical in configuration with the plates 92 of the previous embodiment. An annular clutch plate 97d has its inner periphery sandwiched between the flanges 96d of the housing plates and secured by rivets 98d extending therethrough. Annular friction facings 99d are secured to the opposite surfaces of the clutch plate 97d.

The operation of each of the succeeding embodiments of damper assembly is substantially identical with that described for the damper of FIGS. 1 through 4; although the compression of the spring sets may vary depending on the spring rates of each set. If required, friction washers may be utilized adjacent the hub barrel between the equalizer plates, the housing plates and the hub flange.

Although the speed-responsive friction shoe assemblies of U.S. Patent Application Ser. No. 900,385, other speed-responsive friction couplings can be utilized with the vibration dampers of FIGS. 1–10, such as those shown in U.S. Pat. Nos. 4,037,691; 4,049,094; 4,063,623; and 4,083,440.

I claim:

1. A vibration damper assembly to transmit torque between driving and driven members, comprising an input member adapted to engage torque input means, a hub operatively connected to torque output means and having a pair of diametrically opposed radial arms, a pair of equalizers journalled on and floating independently of said hub, each equalizer including a pair of equalizer plates located on opposite sides of said hub, each plate having a pair of oppositely disposed peripheral tabs, a wedge-shaped separator mounted between each pair of axially aligned tabs of a pair of equalizer plates, resilient means interposed between said hub arms and separators, and a pair of cover plates substantially enclosing said hub, equalizers and resilient means and operatively connected to said input member, each cover plate having integral drive means therein interposed in the path of said resilient means.

2. A vibration damper assembly as set forth in claim 1, in which each equalizer plate is substantially flat, and each separator has a pair of outwardly diverging edges terminating in circumferentially oppositely extending fingers.

3. A vibration damper assembly as set forth in claim 2, including a flat yoke extending between said equalizer plates and having laterally extending lugs, each tab of each equalizer plate having a generally rectangular opening therein to receive a lug, said yoke having an elongated slot receiving said separator.

4. A vibration damper assembly as set forth in claim 3, in which said separator has a generally V-shaped notch in its outer edge between said fingers.

5. A vibration damper assembly as set forth in claim 2, in which each hub arm includes a pair of outwardly diverging edges terminating in circumferentially oppositely extending fingers.

6. A vibration damper assembly as set forth in claim 5, in which said hub arm fingers and said separator fingers act to retain said resilient means in operative position.

7. A vibration damper assembly as set forth in claim 2, in which said cover plates are substantially flat and are journalled on opposite sides of said hub, said cover plates having outer inclined portions terminating in abutting radial flanges secured to said input member.

8. A vibration damper assembly as set forth in claim 2, in which each equalizer plate has a pair of oppositely disposed radial arms terminating in T-shaped ends, and said separator has a v-shaped notch terminating in a rectangular channel adapted to receive the T-shaped ends of the aligned arms of the pair of equalizer plates.

9. A vibration damper assembly as set forth in claim 8, in which said T-shaped end extends transversely of the arm and lie in abutting relation in the channel, the cross bar of each arm lying on opposite sides of the separator.

10. A vibration damper assembly as set forth in claim 9, in which said T-shaped ends and separator lock together and prevent outward movement of the separator.

11. A vibration damper assembly as set forth in claim 7, in which said integral drive means comprises a pair of oppositely disposed drive straps stamped out of each cover plate and offset inwardly to be adjacent said hub arms.

12. A vibration damper assembly as set forth in claim 11, including tabs in the resulting cut-outs of the stamping operation on said cover plates.

13. A vibration damper assembly as set forth in claim 12, including inclined reentry ramps formed in the cover plates adjacent the cut-outs.

14. A vibration damper assembly as set forth in claim 13, in which said reentry ramps act as retainers for and prevent outward movement of said resilient means as the cover plates are shifted away from said hub arms.

15. A vibration damper assembly as set forth in claim 7, including a one-way clutch interposed between said hub and said torque output means.

16. A vibration damper assembly as set forth in claim 15, including a pair of one-way clutch guides on the torque output means and providing shoulders for the journalling of said equalizer plates and said cover plates.

17. A vibration damper assembly as set forth in claim 1, in which each cover plate has a pair of generally arcuate slots formed therein removed 90° from said drive means, and said resilient means comprising spring sets formed of concentrically arranged compression springs, said slots allowing the use of larger compression springs of a higher spring rate.

18. A vibration damper assembly as set forth in claim 2, in which each equalizer plate is substantially flat with the tabs being inwardly offset and having an opening therein, and said separator has a generally central opening to receive a rivet extending through the openings in a pair of axially aligned tabs.

19. A vibration damper assembly as set forth in claim 18, in which said separator opening is slightly elongated to allow limited movement of the separator relative to said equalizer.

20. A vibration damper assembly as set forth in claim 19, in which said separator has pivotal movement relative to said equalizer.

21. A vibration damper assembly as set forth in claim 7, in which said input member comprises a rotary member having a plurality of speed responsive friction shoes acting as a lock-up coupling between the impeller and turbine of a torque converter.

22. A vibration damper assembly as set forth in claim 7, in which said input member is an annular clutch plate having friction facings and secured to the flanges of said cover plates.

* * * * *